United States Patent [19]
Day et al.

[11] Patent Number: 5,631,470
[45] Date of Patent: May 20, 1997

[54] LIQUID ION CHAMBER ELECTRODE APPARATUS

[75] Inventors: Derek J. Day, Los Gatos; Reza Majidi-Ahy, Los Altos, both of Calif.; Willi Fencl, Zurich, Switzerland; Heinrich Riem, Wettingen, Switzerland; Salvatore Provencale, Gebenstorf, Switzerland; Rolf Staehelin, Schlieren, Switzerland

[73] Assignee: Varian Associates, Inc., Palo Alto, Calif.

[21] Appl. No.: 649,888

[22] Filed: May 13, 1996

[51] Int. Cl.$^6$ ................................. G01T 1/185
[52] U.S. Cl. ........................ 250/385.1; 250/374
[58] Field of Search ................ 250/385.1, 374

[56] References Cited

U.S. PATENT DOCUMENTS

| | | | |
|---|---|---|---|
| 4,810,893 | 3/1989 | Meertens | 250/385.1 |
| 5,019,711 | 5/1991 | Antonuk | 250/385.1 |

OTHER PUBLICATIONS

N. Derhacobian, "Determination of Surface Recombination Velocity and Bulk Lifetime in Detector Grade Silicon and Germanium Crystals", IEEE (1994), pp. 406–410.

M. van Herk, "Physical Aspects of a Liquid–Filled Ionization Chamber with Pulsed Polarizing Voltage", Med. Phys. 18(4), Jul./Aug. 1991, pp. 692–702.

P. N. Luke, et al., "Amorphous Ge Bipolar Blocking Contacts on Ge Detectors", IEEE, pp. 85–89, 1994.

P. N. Luke, et al., "A 140–element Ge Detector Fabricated with Amorphous Ge Blocking Contacts", IEEE (1994), pp. 403–405.

D. J. Wagenaar, et al., "A Computer–Controlled X–ray Imaging Scanner Using a Kinestatic Charge Detector", *Rev. Sci. Instrum.* 61 (2), Feb. 1990, pp. 701–711.

*Primary Examiner*—Carolyn E. Fields

[57] ABSTRACT

The present invention provides electrode assemblies for LIC imagers that maximize ion collection and the electric field for the minimum bias voltage. To achieve this optimization the ion collection is confined to small regions. Due to this limited ion collection region, high neutralization efficiencies and fast sweep-out times can be obtained. Furthermore, with an electrode separation of approximately 0.1 millimeters, pulse voltages of less than 100 volts can be used. Low voltages result in improved reliability, longer system life, and lower safety risks.

22 Claims, 3 Drawing Sheets

LIQUID ION CHAMBER ELECTRODE APPARATUS

The present invention relates generally to liquid ion chamber imagers and, more particularly, to an improved electrode design.

BACKGROUND OF THE INVENTION

Liquid ion chamber (LIC) imagers are routinely used as either an alternative to or a complement of traditional x-ray imagers using radiographic film. In a current LIC configuration, the imager is comprised of 256 electrode rows by 256 electrode columns, thus giving a total of 65,536 imaging sites. Each set of electrode strips are incorporated on a printed circuit board (PCB) and the two PCB's are separated by a distance of approximately 1 millimeter. The volume between the two PCB's contains the ionization liquid, typically 2,2,4 trimethylpentane.

In operation, a high-voltage switching system is used to sequentially apply a 20 millisecond high voltage pulse to the electrode rows. During each pulse, the ionization currents from the 256 electrode columns are simultaneously measured. In this configuration, to obtain sufficient ionization currents a polarizing voltage between 300 and 500 volts is required. With a 20 millisecond pulse length, a complete image is acquired in approximately 5 seconds. Since the patient is exposed to radiation during image collection, the shorter the image time the lower the dose of radiation received by the patient. However, the image time can only be reduced by decreasing the high voltage pulse length to the electrodes and by designing an electrode structure that can give sufficient output over this reduced time period.

FIG. 1 is a cross-sectional view of a small area of a LIC matrix. An electrode 1 is the high voltage electrode while electrodes 2 are the ionization current collecting electrodes which connect to the measurement apparatus. An ionization liquid 3 separates electrode 1 from electrodes 2. In this configuration areas 4 and 5 would be considered individual ionization chambers. However since only distance separates the individual chambers, not a physical barrier, there is nothing to prevent ions from being collected by adjoining ionization chambers.

In operation, the high energy x-rays used during the imaging process cause the creation of positive and negative ions within ionization liquid 3. The application of a polarizing voltage cause the ions to move to electrodes 1 and 2, i.e., to an electrode with an opposite sign from that of the ion. A current pulse is formed due to the ions being neutralized at the surfaces of the electrodes. The current pulses are then amplified and used to determine the ionization in that region. Therefore, as a result of the voltage field, the ions are gradually swept out of the liquid.

The period of time that it takes to sweep the ions out of the liquid (i.e., neutralize the ions) is called the transit time. The transit time, T, is equivalent to the distance, d, between electrodes divided by the ion drift velocity. Drift velocity is approximately equivalent to the ion mobility, $\mu$, times the electric field, E. The transit time is given by:

$$T = d/[\mu E] \quad (1)$$

The lower the electric field or the greater the distance between the electrodes, the slower the ion velocity and the longer the transit time. Long transit times lead to slow image acquisition as well as increased radiation dosage to the patient.

Increasing the electric field decreases the transit time while increasing the number of ions captured per pulse. Unfortunately increasing the voltage also increases the safety risks associated with the imager. Furthermore, the high voltage switching circuits required to sequentially pulse the high voltage electrodes tend to have a short lifetime which is compounded by exposure to radiation. This high failure rate leads to LIC instrument unreliability and high cost. A means of increasing the electric field without increasing the voltage applied to the electrodes is therefore desirable.

The field between the electrodes can be considered in two parts. First, there is the uniform field between the parallel parts of the electrodes and second, there is a fringe field associated with the edges of the electrodes. For the uniform part of the field the electric field, E, is linearly related to the voltage, V, applied to the electrodes and their spacing, d, as:

$$E = V/d \quad (2)$$

The fringe field is not uniform and resembles the field of an isolated point of charge. This field decreases inversely with distance so that it is high close to the electrode, decreasing with distance from the electrode. For either component of the electric field, the highest field for any applied voltage is achieved using a small spatial distance.

From the foregoing, it is apparent that a LIC electrode assembly which offers small transit times, high efficiency ion collection, and low voltage operation is desired.

SUMMARY OF THE INVENTION

The present invention provides electrode assemblies for LIC imagers that maximize ion collection and the electric field for the minimum bias voltage. To achieve this optimization the ion collection is confined to small regions. Due to this limited ion collection region, high neutralization efficiencies and fast sweep-out times can be obtained. Furthermore, with an electrode separation of approximately 0.1 millimeters, pulse voltages of less than 100 volts can be used. Low voltages result in improved reliability, longer system life, and lower safety risks.

In one embodiment of the invention an insulating solid layer which has been patterned to form a series of spacers of appropriate thickness is placed between two electrode assemblies, the spacers being located between the high voltage electrodes in order to prevent ion migration between pixels. The resultant spacer layer is comprised of a series of thin wide channels which are later filled with an ionization liquid.

In another embodiment a coplanar electrode structure is formed on a single PCB board, this structure providing ion confinement as a result of the field profile. In order to optimize this structure, each coplanar electrode is comprised of a series of fingers. The fingers of the anode electrode are interwoven with the fingers of the cathode electrode to maximize the fringe field effect. The volume of ionization liquid swept out by this fringe field is confined to the distance between the electrodes and extends about an equal distance into the liquid. Due to the rapid increase in transit time beyond this volume, the remaining liquid is effectively unused and therefore does not have to be physically confined. In order to eliminate cross-talk between pixels, in a variation of this embodiment a grooved or dimpled plate is used to confine the ionization liquid to discrete regions proximate to individual electrodes or pixels, respectively, within the coplanar electrode assembly.

In another embodiment of the invention, a number of discrete electrode plates are stacked together to form a composite electrode assembly. The number of plates which may be stacked together is only limited by the spatial extent of the source of ionization. By stacking plates such that the pixels of each array coincide with the pixels in adjacent arrays, the signal-to-noise ratio of the system can be dramatically improved. It is also possible to improve the spatial resolution of the system simply by offsetting the pixels in each plane from each other.

A further understanding of the nature and advantages of the present invention may be realized by reference to the remaining portions of the specification and the drawings.

DESCRIPTION OF SPECIFIC EMBODIMENTS

Figure 1:
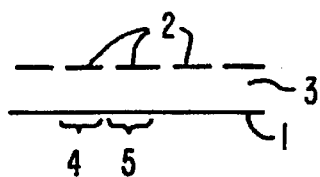
FIG. 1 is a cross-sectional view of a small area of a LIC matrix in a prior art configuration.
Figure 2A:
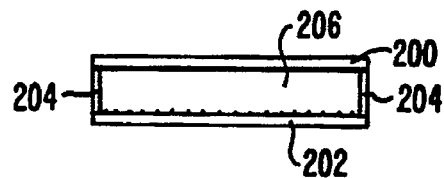
FIG. 2A is a cross-sectional view of a 256×256 array according to the prior art.
Figure 2B:
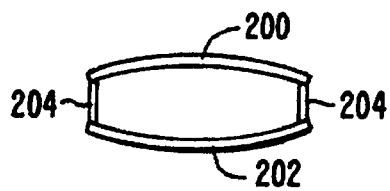
FIG. 2B illustrates the array shown in FIG. 2A with a slight overpressure of the fluid between the two arrays.
Figure 2C:
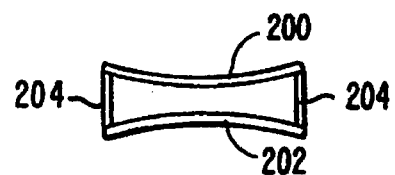
FIG. 2C illustrates the array shown in FIG. 2A with a slight underpressure of the fluid between the two arrays.

A cross-sectional view of an electrode assembly according to the prior art is shown in FIG. 2A. A typical imager uses an array of this form in which a top electrode plate 200 is separated from a bottom electrode plate 202 by a spacer 204. Generally electrode plates 200 and 202 would each have 256 electrode rows, with the two arrays of electrodes running perpendicular to one another thus yielding a total of 65,536 imaging sites or pixels. Plates 200 and 202 are typically formed from a primed circuit board (PCB) material such as FR-4. Spacer 204 seals plates 200 and 202 and runs along the perimeter of the two plates. After assembly, an ionization liquid 206 is placed in the volume defined by plates 200 and 202 and spacer 204. If too much liquid 206 is placed in the assembly's volume, the two plates are forced to slightly bow out at the center (FIG. 2B). At the other extreme, if insufficient liquid is placed in this volume, the two plates become slightly concave (FIG. 2C). Thus it is difficult to achieve and maintain an accurate spacing between the two plates throughout their entire area. In this configuration spacer 204 is typically designed to separate the two plates by a distance of 1 millimeter, thus insuring that the electrodes do not short as the fluid within the volume shifts position.

Figure 3A:
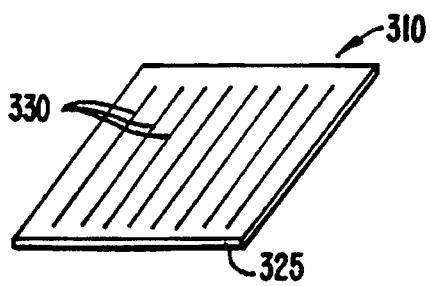
FIG. 3A illustrates a bias electrode plate according to the prior art.
Figure 3B:
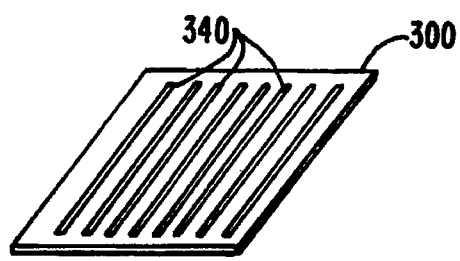
FIG. 3B illustrates a spacer film according to the present invention.
Figure 3C:
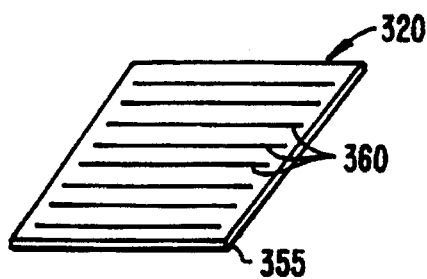
FIG. 3C illustrates a read out electrode plate according to the prior art.

FIGS. 3A–C illustrate one embodiment of the invention in which a spacer film 300 is sandwiched between a bottom electrode plate 310 and a top electrode plate 320, thereby allowing the separation distance between the two plates to be made much smaller than in a conventional imager assembly. Bottom electrode plate 310 is formed using conventional techniques and is comprised of a base material 325 onto which an array of high voltage electrodes 330 has been formed. Plate 310 can be fabricated on a standard FR-4 board using standard photolithography techniques such as those used to fabricate the electrode plates in a conventional imager assembly.

After plate 310 is formed, spacer film 300 is applied to plate 310. Spacer film 300 can be formed from a variety of materials and either deposited directly on plate 310 or applied as a sheet. The preferred material is a solder mask dry film. Solder mask films are ideal for this application since they are designed to be used in conjunction with the same materials as those used to form electrode plate 310, and thus offer excellent bonding characteristics. Furthermore such films are obtainable in appropriate thicknesses (e.g., 100 and 200 micrometers) and are fabricated under fairly high tolerances, insuring that the two electrode plates are maintained at a uniform separation distance.

A series of grooves 340 are formed in film 300 after its application to plate 310, grooves 340 being congruent with electrodes 330. Following patterning of film 300 a second electrode plate 320, comprised of base material 355 and an array of electrodes 360, is bonded to film 300. Electrodes 360 lie at right angles to electrodes 330. After the electrode package has been assembled, grooves 340 are filled with an ionization fluid. The preferred method of forcing the ionization fluid into grooves 340 is through the use of pressure differentials and capillary action.

Figure 4:
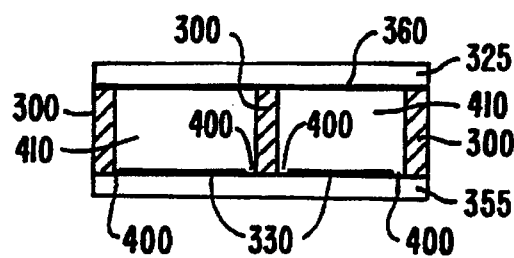
FIG. 4 is a cross-sectional view of an embodiment of the invention in which a spacer film is used to separate the top and bottom electrode arrays as well as to confine the ionization liquid into discrete regions.

FIG. 4 is a cross-sectional view of a portion of an electrode assembly according to the first embodiment. Although the elements in this figure are not drawn to scale, the aspect ratio of the width of electrodes 330 to the thickness of film 300 is large. In one embodiment electrodes 330 are approximately 0.5 millimeters wide and film 300 is approximately 100 micrometers thick.

During fabrication a small gap 400 is formed between electrodes 330 and film 300. Gap 400 helps to prevent the ionization liquid 410 contained within grooves 340 from seeping under film 300. Typically film 300's bonding characteristics are much better with respect to substrate 320 than they are with respect to electrodes 330.

In this embodiment ions formed in ionization liquid 410 are primarily subjected to a uniform field between electrodes 330 and 360. Although there is a fringe field component associated with the edges of the electrodes in any electrode assembly, in this embodiment of the invention electrodes 330 are confined by film insulator 300, thus virtually nullifying the fringe field effects. The fringe field only affects ion collection between adjacent electrodes if one electrode is on while the other electrode is off In this embodiment although electrodes 330 are not simultaneously biased, film 300 prevents ion collection from adjacent electrodes thus eliminating the fringe field effect.

In a second embodiment of the invention ion confinement is accomplished using fringe fields. As described above, the fringe field is associated with the edges of the electrodes. In this embodiment the electrodes are placed in a side-by-side configuration, i.e., in a single plane, thus causing the fringe fields of adjoining electrodes to overlap. Since the fringe fields arise at the edges of the electrodes, this embodiment maximizes the number of edges by using a 'finger' structure as illustrated in FIG. 5.

Figure 5:
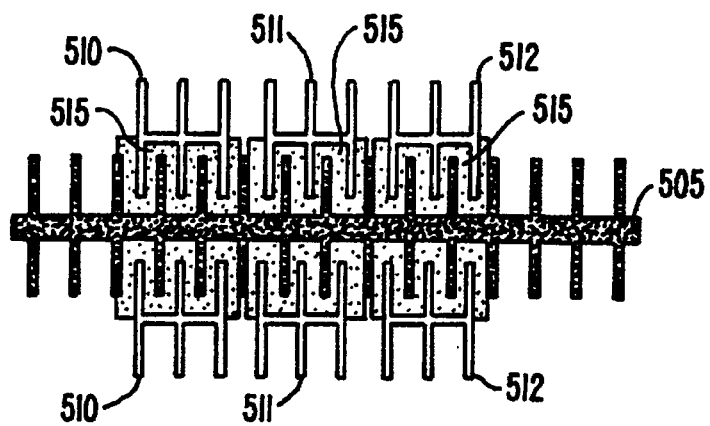
FIG. 5 illustrates a coplanar electrode assembly according to the invention.

FIG. 5 illustrates a small portion of an electrode plate in which only a single continuous row electrode 505 and three electrode pairs 510, 511, and 512 are shown. Shaded portions 515 indicate the three pixels illustrated in this figure. In operation, a voltage pulse would be applied to electrode 505, and the ionization currents per pixel would be measured from electrode pairs 510, 511, and 512. In this embodiment the ionization liquid (not shown) is not confined to discrete regions on the electrode plate, rather the entire electrode plate can simply be placed in an ionization liquid bath. The actual confinement is provided by the electrode design and bias pulse length.

Figure 6:
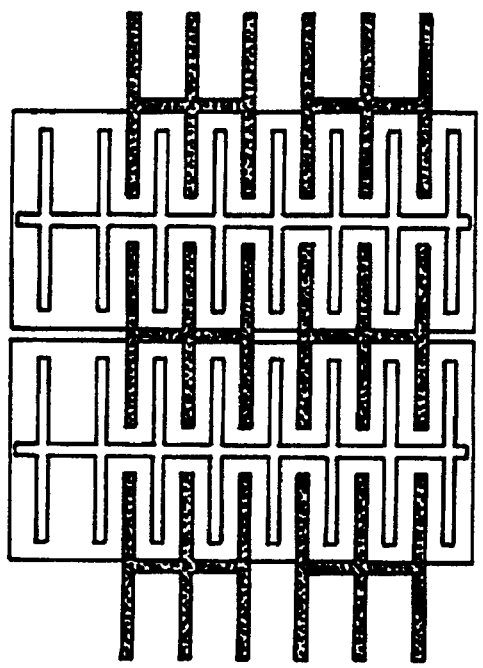
FIG. 6 is an illustration of multiple columns of coplanar electrode assemblies connected through via holes between rows.

FIG. 6 illustrates how these read out electrode pairs form columns connected on the other side of the circuit board through via holes (not shown).

Figure 7:
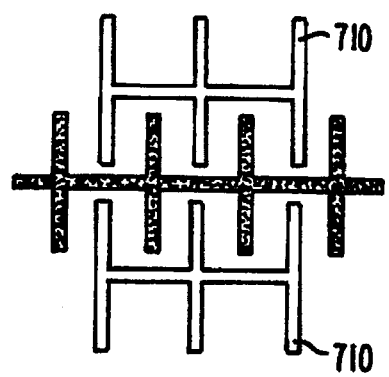
FIG. 7 illustrates a single pixel from a coplanar electrode assembly which has a large collection volume but a slow transit time.
Figure 8:
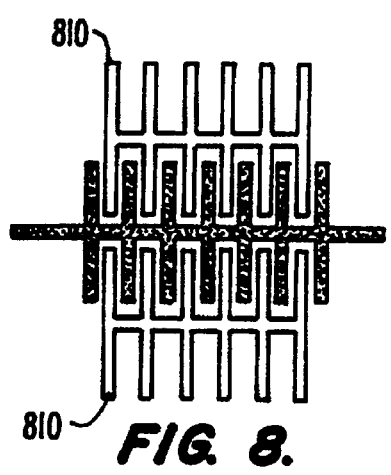
FIG. 8 illustrates a single pixel from a coplanar electrode assembly which has a small collection volume but a fast transit time.

FIGS. 7 and 8 illustrate two different electrode configurations, each representing a single pixel. Electrodes 710 of FIG. 7 each have 3 fingers spaced approximately 200 micrometers apart. Electrodes 810, although representing a similar pixel size to that shown in FIG. 7, have twice as many fingers with a separation distance of approximately 50 micrometers. Note that the configuration shown in FIG. 7, due to the finger spacing and the number of fingers per pixel, has a much larger volume over which to collect ions than the configuration illustrated in FIG. 8. However, since the fringe field is non-uniform and falls off rapidly with distance, for a similar voltage the transit time for the configuration shown in FIG. 7 will be much slower than that associated with the configuration shown in FIG. 8. Thus there is a trade-off between collection volume and transit time. As the collection volume decreases, the signal-to-noise worsens. Due to the non-linear relationship between transit time and spacing, in the preferred embodiment modeling is used to optimize the system.

As described above, in this configuration the ionization liquid is not confined to small regions, rather the entire plate is placed within a single volume of liquid. One disadvantage of this embodiment is that as the volume of liquid increases, the chances of creating ions which are not immediately collected also increases. Thus a latent source of ions is created which may be collected by a pixel outside of the intended volume. This leads to cross-talk that decreases the signal-to-noise ratio.

Figure 9:
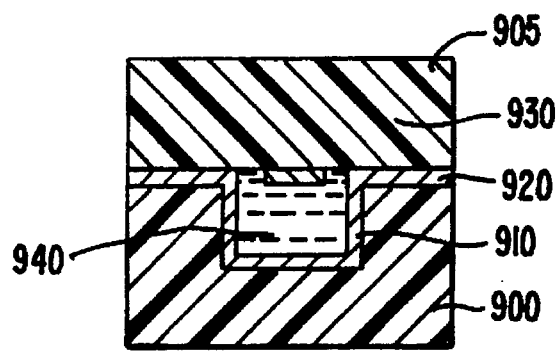
FIG. 9 is a cross-sectional view of a single ionization chamber in another embodiment of the invention.

FIG. 9 is an illustration of an embodiment of the invention utilizing a coplanar electrode configuration similar to that shown in FIGS. 5–8. In this embodiment the ionization liquid is confined to a plurality of regions 910 running congruently with the high voltage electrodes 930.

Figure 10:
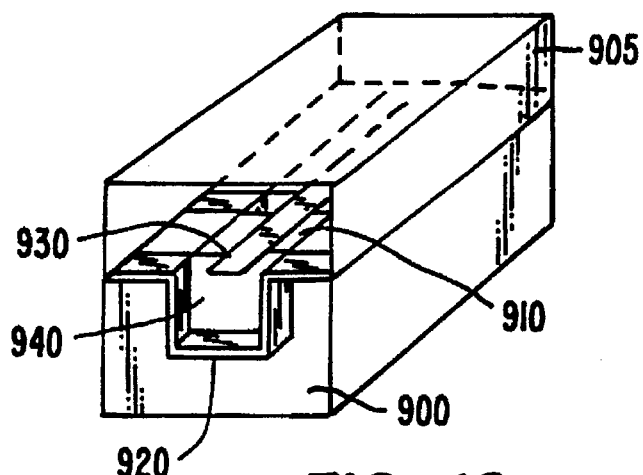
FIG. 10 is a three-dimensional view of the same electrode assembly as shown in FIG. 9.

FIG. 10 is a three-dimensional view of the same electrode assembly as shown in FIG. 9. The electrode assembly is incorporated on two FR-4 boards 900 and 905. The first electrode is formed by first etching a trench 910 into board 900 and then depositing metal within the trench at select regions in order to form a series of electrodes 920. Electrode 930 is deposited on board 905. Boards 900 and 905 are bonded together and filled with a liquid 940 within the ionization chambers 910 formed between them.

In the preferred embodiment of the invention, one or more electrode structures of the type previously described are stacked one upon another. Stacking electrode plates offers two potential benefits. First, stacking the plates such that the pixels of each plate overlay the pixels of the adjacent plates increases the signal-to-noise ratio. For example, stacking four plates together would yield four times the signal with only twice the noise, thus improving the signal-to-noise ratio by a factor of two. A second benefit can be achieved by stacking the electrode arrays such that the pixels from one array are offset from the pixels in the adjoining arrays. In this configuration the spatial resolution of the system can be dramatically improved. Lastly, it is possible to combine these two approaches. For example, by stacking eight arrays together, four of the arrays being offset by one-half pixel width from the other four arrays, either the signal-to-noise or the spatial resolution can be improved by a factor of two.

Figure 11:
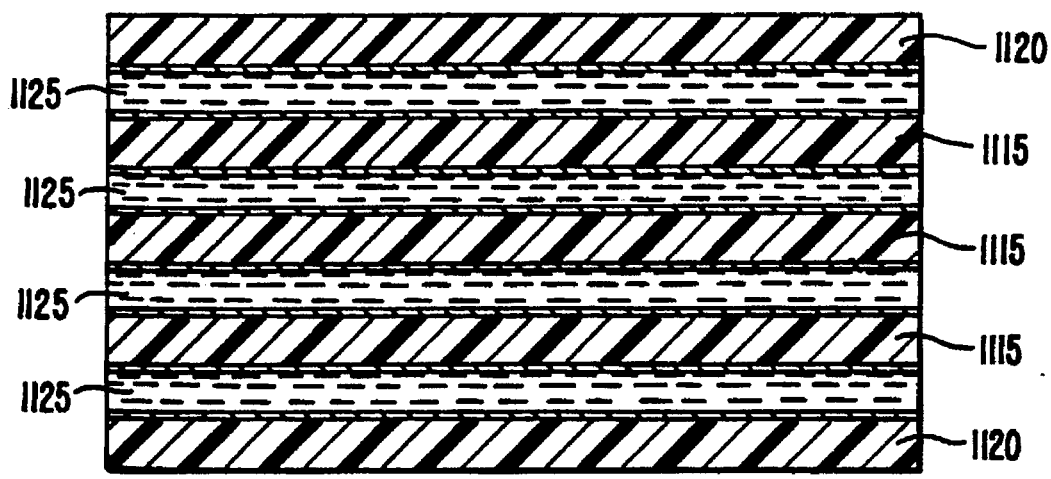
FIG. 11 is a cross-sectional view of a composite electrode assembly according to the invention.

FIG. 11 is a cross-sectional view of a composite electrode array comprised of four individual arrays such as those illustrated in FIGS. 4–9. In this figure three substrates 1115 have electrodes located on both sides of the substrate, thus utilizing a single substrate to support two coplanar electrode structures. Outer substrates 1120 are single-sided arrays, only having an array on the inner surfaces of plates 1120. By placing coplanar arrays on both sides of substrates 1115, the number of actual plates can be reduced from five to three while still achieving a composite of four arrays. Furthermore this configuration does not require a separate layer of ionization liquid 1125 for each array, thus reducing the number of liquid layers from four to two. The reduction of plates and liquid layers allows an extremely narrow and lightweight composite structure to be fabricated. In addition, since plates 1115 are not required to support a layer of liquid but are used to merely support the electrode arrays, plates 1115 can be quite thin. A composite array can also be formed using the other embodiments of the present invention, for example a series of stand-alone uniform field arrays as illustrated in FIGS. 3–4. However, since this configuration would not allow adjacent arrays to share the same ionization liquid, these composites are not as thin as the one utilizing coplanar arrays.

As will be understood by those familiar with the art, the present invention may be embodied in other specific forms without departing from the spirit or essential characteristics thereof. For example, a variety of materials can be used to separate the electrode structures of the uniform field embodiment of the invention. Similarly, the number of fingers per pixel, the size of each individual pixel, and the number of pixels per array for the coplanar electrode fringe field array can be varied depending upon the user's requirements. Accordingly, disclosure of the preferred embodiment of the invention is intended to be illustrative, but not limiting, of the scope of the invention which is set forth in the following claims.

What is claimed is:

1. A liquid ion chamber electrode assembly, comprising:
   a first electrode array;
   a second electrode array; and
   a film spacer interposed between said first and second electrode arrays, said spacer having a plurality of apertures containing an ionization liquid.

2. The liquid ion chamber electrode assembly of claim 1, wherein said first and second electrode arrays are comprised of a sheet of non-conducting material and an array of electrodes.

3. The liquid ion chamber electrode assembly of claim 2, wherein said non-conducting material is FR-4 board.

4. The liquid ion chamber electrode assembly of claim 1, wherein said ionization liquid is an iso-octane.

5. The liquid ion chamber electrode assembly of claim 1, wherein said film spacer is a solder mask dry film.

6. The liquid ion chamber electrode assembly of claim 5, wherein said solder mask dry film is bonded to said first and second electrode arrays.

7. The liquid ion chamber electrode assembly of claim 2, wherein said apertures are elongated channels, said channels running congruently with said electrodes of said first electrode array.

8. The liquid ion chamber electrode assembly of claim 1, wherein said spacer is less than 250 micrometers thick.

9. A liquid ion chamber electrode assembly, comprising:
a first sheet of non-conducting material with a first axis and a second axis;
a first plurality of electrode strips of a first thickness applied to said first sheet of material, said electrode strips parallel to said first axis;
a plurality of non-conducting material strips of a second thickness interposed between said first plurality of electrode strips, said second thickness greater than said first thickness;
a second sheet of nonconducting material with a first surface and a second surface;
a second plurality of electrode strips applied to said first surface of said second sheet of material, wherein said first surface of said second sheet with said second plurality of electrode strips is sealably coupled to said plurality of non-conducting strips, said second plurality of electrodes parallel to said second axis of said first sheet of material; and
a liquid, wherein a portion of said liquid is sealed within the enclosures defined by said first plurality of electrodes, said plurality of non-conducting strips, said second plurality of electrodes, and said second sheet of non-conducting material.

10. A liquid ion chamber coplanar electrode assembly, comprising:
a first array of electrodes affixed to a substrate;
a second array of electrodes affixed to said substrate;
a sealing plate attached to said substrate; and
an ionization liquid confined within the volume defined by said substrate and said sealing plate.

11. The coplanar electrode assembly of claim 10, wherein said first array of electrodes is comprised of a first plurality of electrode strips and said second array of electrodes is comprised of a second plurality of electrode strips, said second plurality of strips segmented to define a plurality of pixels.

12. The coplanar electrode assembly of claim 11, wherein a first plurality of appendages extend from said first plurality of electrodes and a second plurality of appendages extend from said second plurality of segmented electrodes, said first and second pluralities of appendages interspersed.

13. The coplanar electrode assembly of claim 10, wherein said sealing plate has a plurality of regions, said regions confining said ionization liquid to zones proximate to said first array of electrodes.

14. A liquid ion chamber electrode assembly, comprising:
a first substrate with a first surface and a second surface, said first substrate having a plurality of channels running along a first axis of said first surface;
a first plurality of continuous electrode strips attached to said first surface of said first substrate, said electrode strips running perpendicular to said first axis;
a second substrate sealably coupled to said first substrate, said second substrate having a second plurality of continuous electrode strips running perpendicular to said first axis of said first surface, said second plurality of electrode strips proximate to said plurality of channels; and
an ionization liquid confined within said plurality of channels.

15. A liquid ion chamber electrode assembly, comprising:
a first electrode array affixed to a first surface of a first substrate;
a second electrode array affixed to a second substrate;
a first film spacer interposed between said first and second electrode arrays, said first spacer having a first plurality of apertures containing a first ionization liquid;
a third electrode array affixed to a second surface of said first substrate;
a fourth electrode array affixed to a third substrate; and
a second film spacer interposed between said third and fourth electrode arrays, said second spacer having a second plurality of apertures containing a second ionization liquid.

16. The liquid ion chamber electrode assembly of claim 15, wherein said first and second ionization liquids are the same.

17. The liquid ion chamber electrode assembly of claim 15, wherein said first and second spacers are less than 250 micrometers thick.

18. A liquid ion chamber composite electrode assembly, comprising at least two coplanar electrode arrays, each of said coplanar arrays comprised of a first and a second array of electrodes affixed to a single substrate and an ionization liquid confined to a region proximate to said electrode arrays, wherein said coplanar electrode arrays are stacked together to form said composite electrode assembly.

19. The liquid ion chamber composite electrode assembly of claim 18, wherein each of said coplanar electrode arrays define a plurality of pixels, said pixels of each array overlaying the pixels of each adjacent array.

20. The liquid ion chamber composite electrode assembly of claim 18, wherein each of said coplanar electrode arrays define a plurality of pixels, said pixels of each array offset from the pixels of each adjacent array.

21. The liquid ion chamber composite electrode assembly of claim 18, wherein at least two coplanar arrays utilize a single volume of ionization liquid.

22. The liquid ion chamber composite electrode assembly of claim 18, wherein at least two coplanar electrode arrays are placed on a single substrate, utilizing both a first surface and a second surface of said substrate.

* * * * *